Patented June 15, 1954

2,681,293

UNITED STATES PATENT OFFICE 2,681,293

MANUFACTURE OF FLUORESCENT SCREENS FOR CATHODE-RAY TUBES

Leslie John Charles Bayford, Cranford, and Peter Seats, Hayes, England, assignors to Electric & Musical Industries Limited, Hayes, Middlesex, England, a company of Great Britain No Drawing. Application November 21, 1949, Serial No. 128,677

Claims priority, application Great Britain November 24, 1948

8 Claims. (Cl. 117—33.5)

This invention relates to the manufacture of fluorescent screens, by a method of the kind wherein a fluorescent screen is formed by settling particles of phosphor on to a support, for example the base of a cathode ray tube, from water or other liquid suspension medium. It is sometimes the practice to provide said screen with a metal backing, said backing serving as a light-reflector and also serving to reduce the effect known as "ion burn." Hitherto, in the manufacture of the fluorescent screen of a cathode ray tube by a method of the above kind, the phosphor is settled on to the base of the tube and after the phosphor has settled, the supernatent suspension medium is removed from the tube by siphoning or decanting, and the fluorescent layer of phosphor is dried. The metal backing cannot usefully be applied directly to the layer of phosphor particles since due to the irregular arrangement of the particles the metal backing would have an irregular contour which would prevent it from serving as an efficient reflector. Therefore, a thin film of organic substance is provided on the layer of phosphor particles, to serve as a smooth support for the metal. For this purpose, a small quantity of water is introduced into the tube, and a small quantity of a solution of an organic substance, for example nitro-cellulose in a suitable solvent, is applied to the surface of the water, whereupon it spreads evenly over said surface. The organic solvent is allowed to dry so as to leave a thin film of the organic substance on the surface of the water, and the water is then removed by tilting the tube so as to allow the water to run out from under the film, so that the film becomes applied to the fluorescent layer. The tube is then again dried and a thin coating of metal, for example aluminium, is then applied by evaporation to the film of organic substance, which is then removed by heating the tube in air, so that the aluminium coating becomes applied to the fluorescent layer.

The object of the invention is to improve the manufacture of fluorescent screens by a method of the kind above referred to.

In accordance with the invention instead of removing the suspension medium and then again introducing water into the tube, the film of organic substance is formed directly on the surface of the suspension medium.

According to the invention therefore, in the manufacture of a fluorescent screen by settling particles of a phosphor from a liquid suspension medium, there are provided the steps which consist in forming a film of organic substance on the surface of said liquid, and then removing said liquid.

According to the invention also there is provided a method of making a fluorescent screen which comprises settling particles of phosphor from a liquid suspension medium on to a support to form a fluorescent layer, applying a solution of organic substance to the surface of the liquid suspension medium, evaporating the solvent whereby to form a film of the organic substance on the surface of said medium, removing said medium in such manner that the film becomes applied to said fluorescent layer, applying a thin coating of metal to the film of organic substance, and removing said film so that said metal coating becomes applied to said fluorescent layer.

Preferably the solution or organic substance is applied to the surface of the suspension medium after the settling of the phosphor has been substantially completed, but in some cases the solution may be applied prior to the completion of the settling.

If desired, prior to the application of the solution of organic substance some of the liquid suspension medium may be removed, by siphoning or decanting, so as to leave a shallow covering of liquid on the fluorescent layer.

In an example of the manufacture of the fluorescent screen of a cathode ray tube in accordance with the invention, an aqueous suspension of phosphor is introduced into the envelope of the tube and the phosphor is allowed to settle on to the base of the envelope to form a fluorescent layer. A small quantity of a solution of nitro-cellulose in a suitable solvent, for example methyl-ethyl ketone is then applied to the surface of the water, and the solvent is allowed to evaporate, thereby leaving a thin film of nitro-cellulose on said surface. The envelope is then tilted so that the water runs from under the film and out of the envelope, and the film thereby becomes applied to the fluorescent layer. The tube is then dried, and a thin coating of aluminium is then evaporated on to the film of nitro-cellulose. The tube is then heated to decompose the film of nitro-cellulose underlying the aluminium coating, the products of the decomposition escaping through the aluminium coating. The invention thus renders unnecessary the steps of first removing the suspension medium, drying the tube and introducing water into the tube prior to the application of the organic substance.

Phosphors are in general very susceptible to contamination, zinc sulphide phosphors in particular being liable to discolouration by minute traces of foreign substances. The invention reduces the risk of such contamination by virtue of the omission of the step of introducing further water into the tube once the phosphor has been settled. It also represents a considerable saving of time when the manufacture of a large number of tubes is involved.

What we claim is:

1. A method of making a fluorescent screen, comprising the steps of settling particles of phosphor from a liquid suspension medium on to a support to form a fluorescent layer, retaining at least some of said liquid medium with the settled particles, applying a solution of organic substance in a solvent to the surface of said liquid suspension medium, evaporating said solvent to form a film of said organic substance on said surface of said medium, removing said medium to apply said film to said fluorescent layer, applying a coating of metal to said film, and removing said film to apply said metal coating to said fluorescent layer.

2. A method of making a cathode ray tube, comprising the steps of settling particles of phosphor from a liquid suspension medium on to the end wall of a cathode ray tube envelope to form a fluorescent screen, applying a solution of organic substance in a solvent to the surface of said liquid suspension medium which completely covers said settled particles, allowing said solution to spread over the surface of said medium, evaporating said solvent to form a film of said organic substance on the surface of said medium, removing said medium to apply said film to said fluorescent screen, applying a coating of metal to said film, and removing said film to apply said metal coating to said fluorescent screen.

3. A method of making a cathode ray tube, comprising the steps of settling particles of phosphor on to the end wall of a cathode ray tube envelope from an aqueous suspension medium to form a fluorescent screen on said end wall, applying a solution of nitrocellulose immiscible with said suspension medium to the surface of said medium which completely covers said settled particles, allowing said solution to spread over the surface of said medium, evaporating the solvent to form a film of nitrocellulose on the surface of said medium, removing said medium to apply said film to said fluorescent screen, applying a coating of aluminium to said film, and heating said film to drive off the constituents of said film through said coating of aluminium to leave said coating on said fluorescent screen.

4. In the manufacture of a cathode ray tube, the steps of settling particles of phosphor on to the end wall of a cathode ray tube envelope from a liquid suspension medium to form a fluorescent screen on said end wall, retaining at least part of said medium in said envelope sufficient completely to cover said settled particles, applying a solution of a film forming substance on the surface of the retained medium, allowing said solution to spread over the surface of said medium and to form a film, removing said medium to apply said film to said fluorescent screen, and applying a coating of metal to said film.

5. In the manufacture of a cathode ray tube in accordance with claim 4, applying a coating of aluminium to said film.

6. In the manufacture of a fluorescent screen by settling particles of phosphor from a liquid suspension medium which completely covers said settled particles, the steps of forming a film of an organic substance on the surface of said medium, removing said medium, and applying a coating of metal to said film.

7. In the manufacture of a fluorescent screen in accordance with claim 6, applying a coating of aluminium to said film.

8. A method of making a fluorescent screen in a cathode ray tube, comprising the steps of settling particles of phosphor on to the end wall of the envelope of said cathode ray tube from an aqueous suspension medium to form a fluorescent screen on said end wall, applying a solution of a water insoluble heat removable film forming substance to the surface of said medium which completely covers said settled particles, allowing said solution to spread over the surface of said medium, vaporizing the solvent of said film forming substance to form a film on said medium, removing the medium to apply said film to said fluorescent screen, applying a coating of metal to said film, and heating said film to drive off the constituents of said film through said coating of metal to leave said metal coating on said fluorescent screen.

References Cited in the file of this patent

UNITED STATES PATENTS

| Number | Name | Date |
|---|---|---|
| 618,672 | Henry | Jan. 31, 1899 |
| 2,078,008 | Lurie | Apr. 20, 1937 |
| 2,374,310 | Schaefer | Apr. 24, 1945 |
| 2,597,617 | Campbell | May 20, 1952 |